United States Patent Office 3,521,793
Patented July 28, 1970

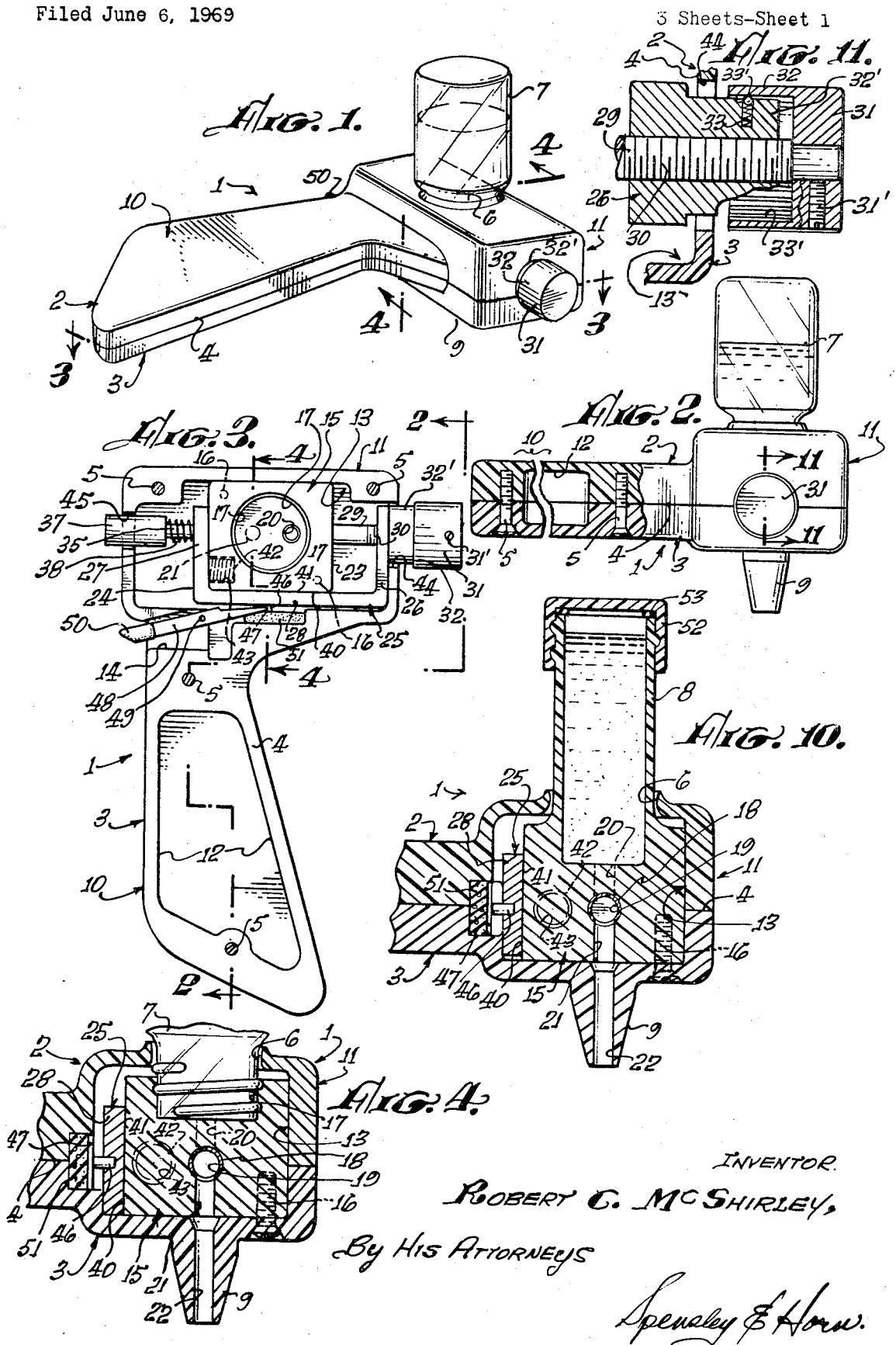

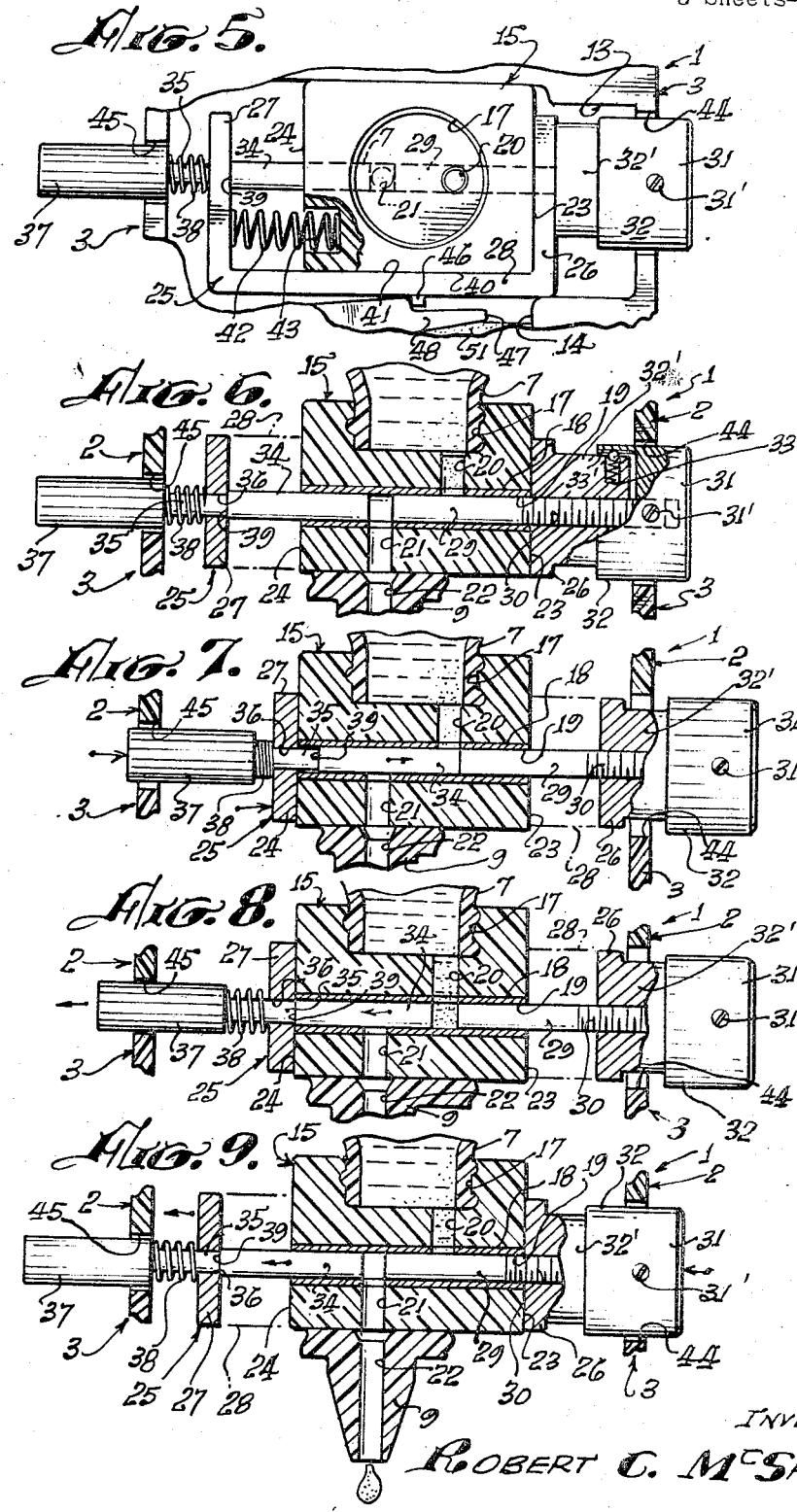

3,521,793
MERCURY DISPENSER
Robert C. McShirley, 6535 San Fernando Road,
Glendale, Calif. 91201
Continuation-in-part of application Ser. No. 691,582,
Dec. 18, 1967. This application June 6, 1969, Ser.
No. 840,094
Int. Cl. G01f 11/10
U.S. Cl. 222—216                      9 Claims

ABSTRACT OF THE DISCLOSURE

A hand held dispenser for dispensing a predetermined amount of mercury is disclosed. The dispenser is particularly suitable for use in dental work where an exact amount of mercury must be measured for use in an amalgam. A cavity of predetermined volume is formed below a sealed container of mercury. The cavity, once filled with mercury, is laterally moved into communications with an outlet port where the cavity is closed, discharging the mercury. The cavity is never filled with air thus preventing the contamination of the cavity by the air associated with prior art mercury dispensers.

---

This application is a continuation-in-part of my application, Ser. No. 691,582, filed on Dec. 18, 1967 and now abandoned.

BACKGROUND OF THE INVENTION

Field of the invention

This invention relates to devices for quickly and accurately dispensing a predetermined amount of mercury from a sealed container.

Prior art

Many dentists now prepare dental amalgams by use of the so-called Eames technique as set forth in a paper by W. B. Eames entitled, "Preparation and Condensation of Amalgam With a Low Mercury-Alloy Ratio," published in The Journal of American Dental Association, April 1959. This article recommends the use of approximately equal amounts of mercury and alloy for the formation of an amalgam in a mechanical amalgamator. In order to form the proper amalgam, a predetermined accurate amount of mercury is required.

Numerous mercury dispensers are commercially available for dispensing accurate amounts of mercury. The major problem with existing mercury dispensers is that they are susceptible to contamination and after repeated use, they begin to dispense inaccurate amounts of mercury. Typically, a build-up of contaminations occurs in the metering cavity of the dispenser which slowly increases to where less than the required amount of mercury is dispensed.

Many of the prior art dispensers comprise a metering cavity which is disposed through a metering rod. The cavity is brought into communication with a supply of mercury such that the mercury fills the cavity. The metering rod is then shifted so that the cavity is made to communicate with an outlet port, where the mercury is discharged from the cavity. Each time the dispensing operation occurs, air is brought into and displaced from the metering cavity. As this occurs, contaminates in the air mix with particles of mercury in the metering cavity. After repeated use, a build-up of these contaminates occur in the metering cavity which slowly decreases the volume of the cavity. Thus, after repeated use, the dispenser begins to dispense lesser amounts of mercury thereby deteriorating the quality of the amalgam.

SUMMARY OF THE INVENTION

A manual mercury dispenser for dispensing accurate predetermined amounts of mercury is described. The dispenser comprises a body which is utilized for supporting a sealed container of mercury and a dispensing device. The dispensing device comprises means for forming a cavity of predetermined volume in a cylindrical bore which communicates through a passage with the container of mercury. The cavity, once filled with mercury is shifted laterally until it communicates with a discharge port. The cavity is closed above the discharge port as the mercury is discharged. Since the cavity is formed beneath the passage linking the bore with the container of mercury, no air from the cavity comes in contact with mercury. Thus, there is no contamination build-up within the cavity as is normally associated with the prior art dispensers.

It is an object of the present invention to provide a mercury dispensing device whose metering cavity is never filled with air.

BRIEF DESCRIPTION OF THE DRAWINGS

FIG. 1 is a perspective view of the first preferred embodiment of the invention shown in the position in which mercury is dispensed.

FIG. 2 is an end elevation view, partially in section as viewed along the staggered line 2—2 of FIG. 3, a portion of the handle being broken away to conserve space.

FIG. 3 is a sectional plane view taken in the plane of the meeting lines that has forming the handle and frame component, the dispensing unit being shown in full lines with the container removed, the parts being shown in the position occupied when the cavity filling step of operation is being performed.

FIG. 4 is an enlarged scale, transverse sectional view taken on the line 4—4 of FIG. 3;

FIG. 5 is an enlarged scale, fragmentary plan view taken in the same plane as FIG. 4 but showing the relation of the parts at the end of the dispensing step of the oepration of the device;

FIGS. 6, 7, 8 and 9 show progressive steps in the cycle of a dispensing operation;

FIG. 10 is a sectional view generally like FIG. 4 but showing a modification involving the use of a supply container formed integrally with a component of the device;

FIG. 11 is an enlarged scale, fragmentary sectional view on the line 11—11 of FIG. 2;

DESCRIPTION OF THE PREFERRED EMBODIMENTS

Figure 12:
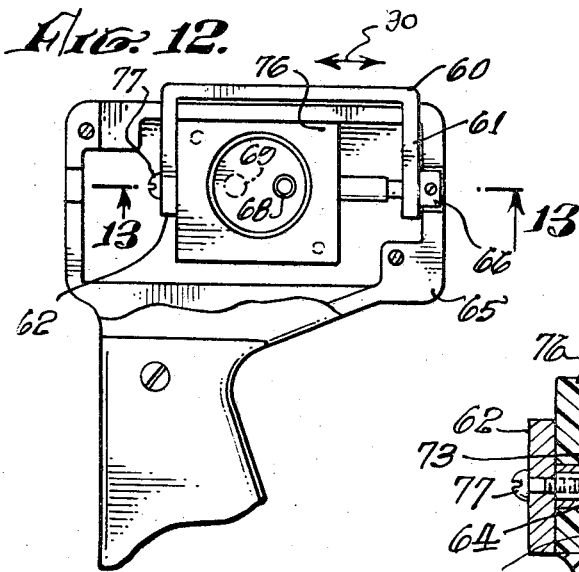
FIG. 12 is a sectional plan view of an alternate embodiment of the present invention.

Referring to the drawings, both illustrated embodiments of the device include a combined handle and frame structure 1, comprised of upper and lower halves (having reference to the position of use of the device), said halves being formed generally as mirror image duplicates meeting on a medial parting line 4 and connected together by screws 5. The upper frame half 2 has an opening 6 formed therein affording clearance for a supply container of mercury which may be either a separate container 7 as shown in FIGS. 1, 2 and 4 or an integrally formed container 8 as shown in FIG. 10 and the lower half 3 is characterized by a delivery spout 9 to which more detailed reference will be made.

The frame halves are formed of plastic moldings and are joined by the screws to form the complete handle and frame structure comprising the laterally extending handle portion 10 and the dispenser supporting portion 11. The meeting faces of the halves 2 and 3 are cut away at the portion thereof forming the handle portion 10 as at 12 to limit the amount of material and to present a plastic molding having a somewhat uniform wall thickness to facilitate the molding thereof. The portions of the members forming the dispensing supporting portions are cut away and combined to form a cavity 13 in which the dispensing means is housed and at the juncture of a handle and dispenser supporting portions, the members are cut away to form a cavity 14 housing a latch means to which reference will presently be made. The entire dispenser is suitable in size to allow it to be held by a hand.

Referring more specifically to FIGS. 1 through 9 of the drawings, the dispensing means of the first illustrated embodiment of the invention includes a base block or body member 15 secured in the cavity 13 by screws 16 extending through the side wall of the frame member 3 and threaded by engaging the body member. This body member is provided with an internally threaded recess or socket 17 formed in the face thereof which, having reference to FIG. 4, constitutes the upper face of the body member and in which socket, the screw threaded neck of the container 7 (usually a bottle) containing a quantity of mercury is received, said body member thus serving as a closure for the container. The body member is preferably formed from plastic and is provided with a metal tube 18 extending therethrough at right angles to the axial line of the socket 17 and preferably with the axial line thereof intersecting the axial line of the socket 18, the interior of said tube forming a cylinder bore 19 for certain piston elements to be presently described and the metal of said tube being one for which mercury has no affinity, as, for example, stainless steel. An inlet port or passage 20 extending through the body member 15 and the wall of the tube 18 affords an interconnection between a portion of the socket 17 not engaged by the end wall of the container neck and the cylinder bore 19 and an outlet port 21 similarly extends from a point in the cylinder bore 19 which is laterally spaced from the inlet port through the tube 18 and the body 15 in alignment with the passage 22 in the outlet or discharge spout portion 9 which is formed as an integral portion of the frame member 3.

The container 7 should be a sealed container so that the toxic mercury fumes are contained. In addition, the container 7 should be sealed so that the dispenser may be turned or rested on the container such that the main body of the dispenser, if above the container 7, without the mercury escaping from the container. As will be explained, this is necessary to allow air to flow through the main body of the dispenser into the container 7.

The body 15 is provided with parallel end faces 23 and 24 between which the cylinder bore 19 extends and a yoke member 25 extends around three sides of the body and includes a first arm 26 extending parallel to the end face 23, a second arm 27 extending parallel to the end face 24, said arms being connected by an intermediate integrally formed body portion 28. The arm 26 carries a cylindrical bar constituting a first metering piston 29 which is slidable in the adjacent portion of the cylinder bore 19 and which is mounted for longitudinal adjustment in the arm 26 by screw threads 30 formed on the piston and engaging complementary threads in the opening in the arm 26 through which the piston rod extends. A knob 31 secured on the outer end of the piston rod by a set screw 31' affords means for rotation of the piston rod 29 with attendant axial shift thereof relative to the arm 26 for purposes to be later explained. The knob 31 includes a skirt portion 32 which overlaps the boss 32' on the arm 26 in which the threads complementary to the threads 30 are formed and a radially extending spring detent means 33 on the boss 32' engages a serrated inner face 33' of the skirt portion 32 to prevent unintended rotation and endwise adjustment of the knob and piston 29 relative to the arm 26.

The second yoke arm 27 carries a second cylindrical bar slidable in the opposite end of the bore 19 and constituting a second metering piston 34, said piston at its outer end having a reduced diameter end portion 35 which is freely slidable in an opening 36 in the yoke arm 27. Beyond the yoke arm 27, the reduced end diameter portion 35 carries a knob 37 and a compression spring 38 surrounding the reduced diameter portion 35 and reacting between the opposing faces of the arm 27 and the knob 37 serves constantly to urge the piston in a direction out of the bore 19 to the extent permitted by the engagement of the shoulder 39 on the piston 34 formed by the reduced diameter end portion with the face of the arm 27 adjacent to the body end face 24.

Pistons 29 and 34 should sealingly engage bore 19 such that mercury will not pass between the pistons and bore. As is described herein, air will pass between the pistons and bore and will equalize the pressure within container 7. This is achieved by providing a slight clearance passage between the pistons and the bore through which a small flow of air will pass. The mercury will not pass through this passage due to the viscosity of the mercury and to the non-wettable by mercury character of the materials (i.e. stainless steel) as before mentioned.

The yoke arms 26 and 27 are spaced apart a distance greater than the length of the body 15 between them and the two pistons carried by the yoke arms serve to guide the yoke in movement parallel to the bore 19. The body 1 is provided with a side face 40 which is parallel to the cylinder bore 19 and the adjacent face 41 of the yoke member portion 28 fits closely adjacent to that face and prevents any rotational movement of the yoke about the axial line of the cylinder bore. A compression spring 42 is seated in a recess 43 in the body end face 24 and engages the yoke arm 27 at a point thereon laterally offset from the piston 29 and tends constantly to move the yoke in a direction bringing the yoke arm 26 into engagement with the body end face 23, said spring having a greater resistance to compression than the spring 38 for purposes to be explained.

The frame member wall portion defining the end of the cavity 13 in which the yoke arm 26 is disposed is provided with an opening 44 affording clearance for reciprocable movement of the boss 32 and the knob 31 associated therewith incident to operation of the device as will presently be explained, and the opposite end wall of the frame is correspondingly provided with an opening 45 affording clearance for reciprocable movement of the knob 37. The outer face of the yoke body member 28 is provided with an outwardly projecting stud 46 adapted to be releasably engaged by the end 47 of a latch member 48 disposed in the recess 14 and mounted between its ends on a pivot pin 49 carried by the frame member 3 within the recess 14. The opposite end 50 of said latch member projects out of the recess 14 and is disposed for manual engagement substantially at the juncture of the rear face of the handle 10 with the frame member wall through which the knob 37 projects. Resilient means, here shown as a sponge rubber cushion 51 engages the side of the latch member end 47 opposite the yoke member 28 and tends constantly to urge the latch member end toward the yoke body.

Referring to FIG. 10, the only essential difference between the embodiment there shown and the embodiment shown in FIGS. 1–9 is the use of an integrally formed supply container 8 having the outer end thereof normally closed by a screw cap 52 with an interposed gasket 53. Other than this change, all of the other parts have been given the same numbers as in the description of the first described embodiment and accordingly, the description thereof need not be repeated.

In describing the mode of use of the dispenser, it will be assumed that the container has been supplied with a quantity of mercury and that the device is in the attitude shown in FIG. 1 with the metering pistons of the dispensing portion of the invention disposed in their position of repose as best shown in FIGS. 5, 6 and 9 and that the adjusting knob and piston 29 to which it is connected has been suitably adjusted in the arm 27 of the yoke. The user picks up the device and presses inwardly on the button 37 as far as it will go. Incident to this movement, the piston 34 will first engage the end of the piston 29 expelling the air between them through the outlet passage and will then move the piston 29 and the yoke to which it is connected by the thread 30 against the resistance of the spring 42 to the right until the arm 27 engages the end face 24 of the body member 15. At this point, the parts will be in the approximate position shown in FIG. 7 with the pistons 34 and 29 in contact with each other and with the end of the piston 29 positioned past the vertical plane containing the inlet passage 20. In thus moving the yoke to the right, the detent 46 will have been moved past the distal end 47 of the latch member 48 allowing the resilient cushion 51 to move the latch member back of the detent 46 as shown in FIG. 3, thus locking the yoke and the pistons in the position shown in FIG. 3. Upon relieving the manual pressure on the button 37, the spring 38 will move it and the piston 34 to the left as shown in FIG. 8 separating the ends of the pistons from one another and forming a cavity between them which, being in communication with the inlet passage 20, is filled with mercury from the supply as rapidly as the space is formed, it being noted that there is no necessity for the incoming mercury to displace air which would then have to travel through the body of mercury in the container. At this point, it is to be noted that the endwise adjustment of the piston 29 by rotating it through the knob 3 effects a variation in the size of the cavity which will be formed by the retraction of the piston 34 under the influence of the spring 38.

The device is then positioned so that the outlet spout 9 is over whatever receptacle is to receive the mercury that will be dispensed and the latch member 48 is moved clockwise about its pivot sufficiently to dislodge the end 47 thereof from engagement with the detent 46, whereupon, the stored power of the spring 42 is released to quickly move the yoke and both pistons to the left as viewed in FIGS. 3 and 5–9 until the inner face of the yoke arm 26 contacts the end face 23 of the body member 15. This, as will be noted in FIGS. 6 and 9 brings the separated pistons and the cavity formed thereby together with the body of mercury trapped therein over the body member discharge port 21 which is in alignment with the discharge spout 22 allowing the mercury to fall therefrom into the intended receptacle, said spring induced movement of the pistons causing the piston 29 to seal off the passage 20 without allowing the ingress of air into the body of mercury in the container. Actually, the operation of the dispenser is extremely rapid and the actual dispensing operation need not take more than about two seconds. As is well known in the preparation and installation of dental restorations, time and accuracy are of the utmost importance. With this dispenser, the dentist is able quickly and with extreme accuracy to dispense a desired amount of mercury for use with an equally accurately predetermined amount of alloy so that the resulting amalgam will be that which has the greatest possible strength. Moreover, the body of mercury is always kept completely sealed so that deterioration by oxidation is rendered virtually impossible.

It should be noted that each time mercury is dispensed, the pressure between the level of mercury in container 7 and the walls of the container decreases. This occurs since the volume of mercury is decreased after each dispensing operation which simultaneously increases the empty volume in the container. Since almost no air enters the container through the dispenser driving the dispensing operations, eventually, this decrease in pressure within container 7 would prevent the mercury from being dispensed. If the mercury dispenser is turned over, such that the main body of the dispenser is above container 7, the air pressure in the container will then be equalized. This equalization occurs since air is then able to flow into the container between the pistons and bore. Thus, after each dispensing operation, the air pressure within container 7 may be readily equalized. It should be noted that when this equalization occurs, the air, which is added to container 7, does not filter through the mercury. Therefore, the pressure in container 7 is equalized with air without having the air bubble or filter through the mercury. This eliminates the contamination normally associated with mercury dispensing systems.

Referring to FIGS. 12 through 16, an alternate embodiment of the present invention is disclosed. The dispenser frame 65, illustrated in FIG. 12, is similar to the dispenser frame discussed in conjunction with FIGS. 1 through 3. Body members 76, mounted within frame 65, is similar in construction to body member 15 previously discussed. A yoke 60, having a first yoke arm 61 and a second yoke arm 62, is disposed about body member 76 and is adaptable for being manually moved in the directions indicated by arrow 90, externally from frame 65. A cylindrical bore 72 is disposed through body member 76 and is similar to bore 19, discussed in conjunction with FIGS. 1 through 10. Bore 72 communicates with container 70 through passage 68 which is similar to passage 20, previously discussed. Bore 72 also communicates with outlet port 69 which is similar to outlet port 21, previously discussed.

Figure 14:
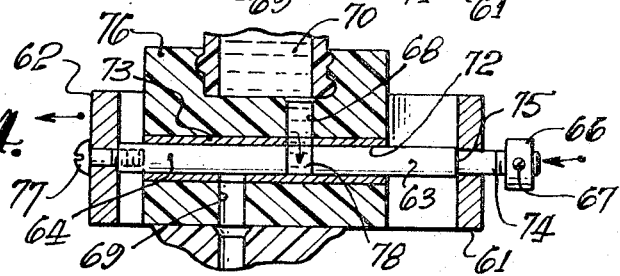

A first piston or metering piston 63 is disposed within bore 29 and adaptable for slidingly and sealingly engaging the bore. The piston 63 is made to snugly engage the bore 72 such that it does not readily move within bore 72. Piston end 74 is an integral part of piston 63, axially disposed along the piston but having a smaller diameter than piston rod 63. A shoulder 75 is formed at the junction of piston 63 and piston end 74. An aperture is disposed through the first yoke arm 61 allowing piston end 74 to freely move through the aperture. The aperture is small enough to prevent the passage of piston 63; thus, as yoke 60 moves, as shown in FIG. 14, piston 63 is forced to move when shoulder 75 engages yoke arm 61. Piston end 74 is threaded and adaptable for receiving knob 66. Knob 66 is similar to knob 31 as previously discussed. A set screw 67 engages knob 66 to prevent the knob from rotating about piston end 74.

A second piston 64, which is adaptable for slidingly and sealingly engaging bore 72, is rigidly coupled to the second yoke arm 62 by screw 77. Piston 64 may be similar in construction to pistons 29 and 34, illustrated in FIGS. 1 through 11.

Figure 13:
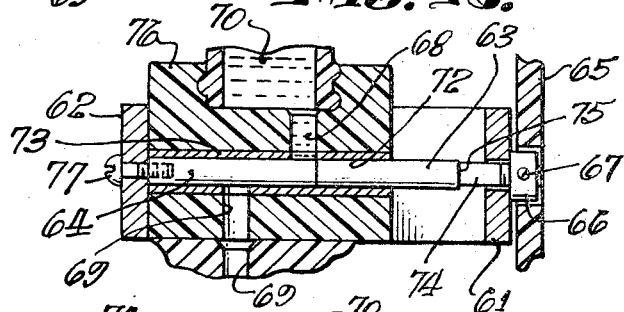
FIGS. 13, 14, 15 and 16 show progressive steps in the cycle of a dispensing operation of the alternate embodiment of the present invention along section line 13—13 of FIG. 12.
Figure 15:
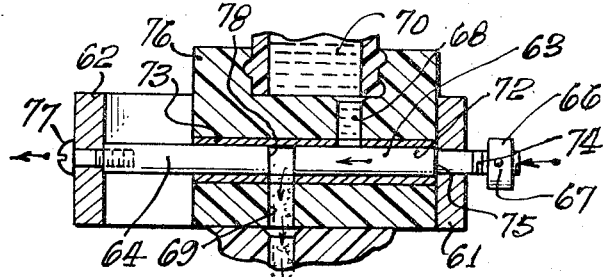

The operation of the alternate embodiment of the mercury dispenser may be readily understood with reference to FIGS. 13 through 16. In FIG. 13, the yoke 60 is shown with yoke arm 62 abutting body 76. This is a position in which the dispensing operation begins. To dispense mercury, the yoke 77 is moved in the direction indicated by the arrows in FIG. 14, such that piston 64 is moved to form a cavity 78 defined by the adjacent end of pistons 63 and 64, and bore 72. Mercury from container 70 flows from passage 68 into cavity 78 by the force of gravity. Since piston end 74 freely moves within yoke arm 61, piston 63 does not move during the time that cavity 78 is first formed. In addition since piston 63 snugly engages bore 72 it does not move when the cavity 78 is being formed. Once yoke arm 61 has engaged shoulder 75 (FIG. 14), piston 63 is also made to move in the direction of piston 64. As this occurs, the cavity 78 now filled with mercury is moved along bore 72 until it communicates with port 69, as shown in FIG. 15. When this occurs, the mercury flows from the cavity into the outlet port 69 by the force of gravity. The cycle begins again when the yoke 60 is moved in the direction indicated by the arrow in FIG. 16.

Figure 16:
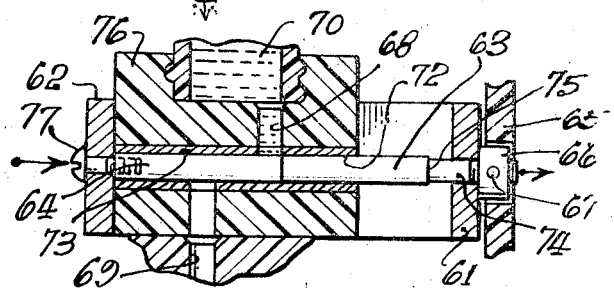

Note, that with the first movement of arm 62 towards body member 76, cavity 78 is closed. Thus, any air contained within cavity 78 will pass out through port 69 and not through passage 68. As arm 62 again abuts body member 76, as shown in FIG. 16, the dispensing cycle is completed. As with the case of the previously described dispenser, the amount of mercury dispensed during each cycle may be varied by changing the position of knob 66 along piston end 74. In addition as previously discussed, the pressure within container 70 may be equalized without contaminating the mercury by turning the dispenser such that the container is below the body of the dispenser.

It has been found that the mercury dispenser is much less susceptible to contamination if cylindrical bores 19 and 72 are lined with fluorocarbon material, such as tetrafluoroethylene (Teflon). This material also seals against the mercury, but permits the air flow through the clearance as before mentioned.

While in the foregoing specification, there have been described certain presently preferred embodiments of the invention, it is believed to be obvious that changes and modifications may suggest themselves to others, in the light of the foregoing disclosure.

I claim:

1. A manual means for containing a supply of mercury and dispensing an accurately determined quantity therefrom; said means comprising a body supporting a sealed container for the mercury supply and a dispensing device carried by said body including a means operable to form a cavity of predetermined volume at a point within said body below said container, an inlet passage means affording a flow path for mercury from said container to said point of cavity formation, an outlet passage means extending from a point within said body laterally offset from said inlet passage a distance sufficient not to overlap said inlet passage, means for manually shifting the cavity forming means and the mercury filling said cavity laterally into communication with said outlet port for discharge by gravity of the mercury in said cavity through said outlet port and a passage for allowing air to flow into said container without passing through said mercury when said manual means is turned such that said dispensing device is above said container.

2. A mercury supply containing and dispensing means as claimed in claim 1 in which said dispensing devices include a cylinder bore extending through said body and a pair of piston elements reciprocable in opposite ends of said bore, one of said piston elements being first movable into engagement with the other of said piston elements with resultant expulsion of air from between the adjacent ends of said piston elements and then being movable out of engagement with said other piston element with resultant formation of said cavity.

3. A mercury containing and dispensing means as claimed in claim 1 in which said dispensing devices include a pair of piston elements mounted in opposite ends in a bore in said body and in which said piston elements are interconnected externally of said bore for reciprocable movement in unison in said bore.

4. A mercury containing and dispensing means as claimed in claim 1 in which said cavity forming means includes a piston reciprocable in said cylinder bore, in which said piston is carried by a holding means disposed externally of said body and reciprocable and in which said piston is longitudinally adjustable on said holding with said piston relative to said body, means to vary the volume of the mercury receiving cavity.

5. A mercury containing and dispensing means as claimed in claim 2 in which a yoke member is mounted for reciprocable movement on said body and is provided with arm portions extending across opposite ends of said bore, in which one of said pistons is connected to one of said arms by means operable to effect longitudinal adjustment of said one piston relative to said one arm, and in which the other of said pistons is connected to the other of said arms by means constantly permitting a predetermined amount of longitudinal movement of said other piston relative to said other of said arms.

6. A mercury containing and dispensing means as claimed in claim 2 in which a yoke member is mounted for reciprocable movement parallel to the axis of said bore and carries said piston elements, in which spring means is constantly operable to urge said yoke and pistons toward one end of its path of travel, and in which a manually releasable latch means is operable to retain said yoke member and pistons at the opposite end of its path of travel.

7. A mercury containing and dispensing means as claimed in claim 3 in which the means interconnecting said piston elements for unison movement includes a connection to one of said piston elements in which said one of said piston elements has a limited amount of free reciprocable movement relative to the piston interconnecting means; the said limited reciprocable movement in one direction serving to form said cavity.

8. The mercury containing and dispensing means as defined in claim 2 wherein said cylinder bore is lined with tetrafluoroethylene.

9. The mercury containing and dispensing means as defined in claim 3 wherein said cylinder bore is lined with tetrafluoroethylene.

References Cited

UNITED STATES PATENTS

| | | | |
|---|---|---|---|
| 1,474,083 | 11/1923 | Leonard | 222—384 X |
| 1,789,051 | 1/1931 | Opitz | 222—216 |
| 2,603,386 | 7/1952 | Barnes | 222—361 X |
| 3,168,213 | 2/1965 | De Gon | 222—340 X |
| 3,224,651 | 12/1965 | Dayton et al. | 222—361 X |

ROBERT B. REEVES, Primary Examiner

H. S. LANE, Assistant Examiner

U.S. Cl. X.R.

222—308, 336, 361, 473